US008358664B2

(12) United States Patent
Fan et al.

(10) Patent No.: US 8,358,664 B2
(45) Date of Patent: *Jan. 22, 2013

(54) METHOD AND SYSTEM FOR PROVIDING SMART OFFLOAD AND UPLOAD

(75) Inventors: Kan Frankie Fan, Diamond Bar, CA (US); Scott McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,632

(22) Filed: Nov. 10, 2009

(65) Prior Publication Data

US 2010/0057941 A1 Mar. 4, 2010

Related U.S. Application Data

(63) Continuation of application No. 10/975,070, filed on Oct. 28, 2004, now Pat. No. 7,636,372.

(60) Provisional application No. 60/530,646, filed on Dec. 19, 2003.

(51) Int. Cl.
*H04L 12/00* (2006.01)

(52) U.S. Cl. .......................... 370/463; 370/469; 709/250

(58) Field of Classification Search .................. None
See application file for complete search history.

(56) References Cited

U.S. PATENT DOCUMENTS

| 7,274,706 | B1 * | 9/2007 | Nguyen et al. ........... 370/419 |
| 7,496,689 | B2 * | 2/2009 | Sharp et al. ............. 709/250 |
| 7,554,993 | B2 * | 6/2009 | Modi et al. ............. 370/401 |
| 7,664,883 | B2 * | 2/2010 | Craft et al. ............. 709/250 |
| 2002/0156927 | A1 * | 10/2002 | Boucher et al. ........... 709/250 |
| 2003/0204631 | A1 | 10/2003 | Pinkerton et al. |
| 2003/0204634 | A1 | 10/2003 | Pinkerton et al. |
| 2004/0054814 | A1 | 3/2004 | McDaniel |
| 2004/0213290 | A1 * | 10/2004 | Johnson et al. ........... 370/469 |
| 2004/0243723 | A1 | 12/2004 | Davis et al. |
| 2005/0021680 | A1 * | 1/2005 | Ekis et al. ............. 709/219 |
| 2005/0135412 | A1 | 6/2005 | Fan |
| 2005/0180322 | A1 * | 8/2005 | Lok et al. ............. 370/229 |
| 2007/0030861 | A1 | 2/2007 | Johnson et al. |
| 2007/0064725 | A1 | 3/2007 | Minami et al. |
| 2008/0056124 | A1 | 3/2008 | Nanda et al. |

FOREIGN PATENT DOCUMENTS

| WO | WO 02/061525 A2 | 8/2002 |
| WO | WO 02/061525 A3 | 8/2002 |

OTHER PUBLICATIONS

European Patent Office. European Search Report. European Application No. EP04 02 8279. 3 pages. Mar. 1, 2005.

* cited by examiner

*Primary Examiner* — Min Jung
(74) *Attorney, Agent, or Firm* — Sterne, Kessler, Goldstein & Fox PLLC

(57) ABSTRACT

Provided is a system and method for performing smart offloads between computer applications module and a network interfacing device within a data communications system. The method includes receiving data requests from the computer applications module and determining whether the received data requests require offloading. The received requests are forwarded along a first data path to the network interfacing device if offloading is required. If offloading is not required, the received data requests are forwarded along a secondary data path to a host protocol stack for processing. Next, the protocol processing is performed and the processed data requests are forwarded to the network interfacing device.

15 Claims, 5 Drawing Sheets

METHOD AND SYSTEM FOR PROVIDING SMART OFFLOAD AND UPLOAD

This application is a Continuation of co-pending U.S. application Ser. No. 10/975,070 filed on Oct. 28, 2004 by FAN, Kan Frankie et al., entitled A METHOD AND SYSTEM FOR PROVIDING SMART OFFLOAD AND UPLOAD, the entire contents of which are incorporated by reference and for which priority is claimed under 35 U.S.C. §120. As in the parent application Ser. No. 10/975,070, this application claims the benefit of U.S. Provisional Application No. 60/530,646, filed on Dec. 19, 2003, entitled "A Method and System for Providing Smart Offload and Upload," which is incorporated by reference herein in its entirety under 35 U.S.C §119(e).

BACKGROUND OF THE INVENTION

1. Field of the Invention

The present invention relates generally to data transfer in a computer based communication system.

2. Related Art

Traditional communication systems can include a host computer platform, such as a personal computer (PC) running applications such as Oracle, file transfer protocol (FTP), web browsers, etc. It can also include a network interface device (NID) and protocol processing modules that enable the system to transfer data via a computer network. In order to accommodate the transfer of data packets needed to support these applications, transmission control protocols (TCP) and other related techniques are used to properly format the data packets. This formatting facilitates the reception of these packets by remote-end equipment connected to the host computer via one or more computer networks.

TCP Internet Protocol (TCP/IP) is an example of one suite of protocols used in conventional computer networks, such as the Internet. These protocols, which are added to data packets, are typically processed within the host platform by a software module known as a networking protocol stack. A popular implementation of the networking protocol stack is the host TCP stack.

As data rates of computer networks have increased, the TCP stacks have become system choke points. More specifically, the throughput of these TCP stacks is insufficient to accommodate the higher network data rates.

As a solution to this choke point, an offload TCP stack, also known as a TCP Offload Engine (TOE), can be used to process the packets instead of the host TCP stack. This approach frees host resources for processing of the application and allows sustained "wire speed" throughput that can take advantage of today's faster networks.

The traditional communication systems, however, are unable to determine when it is more efficient to process packets within the host TCP stack or when the packets can be more efficiently processed within the offload TCP stack (or TOE). Stated another way, the traditional communication systems are unable to smartly offload (or upload) processing associated with establishing individual TCP connections.

More particularly, there are inherent hardware costs associated with each network connection that a TOE has to support. As more and more individual connection processing (i.e. connections) is offloaded to the TOE, the TOE must be of a more expensive design to accept the additional connections. Additionally, if the system desires to offload more connections than the TOE can accept, based on its architecture, then the number of connections becomes another limitation, or choke point, for the system.

It is possible, however, to offload only a portion of the total connections supported at any one time. Some of the connections can be offloaded to the TOE while other connections continue to be processed within the Host software based TCP stack. Any individual connection, however, must be individually processed in one place or the other. This creates the need for a type of "switch" mechanism to accurately direct traffic requests to the correct stack for processing.

What is needed, therefore, is a switch to smartly and efficiently determine the best set of connections that can be offloaded from the host TCP stack to the TOE, or similar hardware components. Such a switch will reduce the formation of protocol processing choke points and ultimately increase the system's throughput despite connection limitations in the TOE technology.

SUMMARY OF THE INVENTION

Consistent with the principles of the present invention as embodied and broadly described herein, the present invention includes a method for determining when to transfer connections between a software module, for example a host TCP stack, and a network interface device, for example a TCP offload engine (TOE), within a data communications system. The method includes receiving data requests from the software module and determining whether the connection(s) involved are to be offloaded or not. The received requests are forwarded along a first data path to the network interfacing device (NID), such as the TOE if offloading is required or desirable. If offloading is not required or desirable, the received requests are forwarded along a secondary path to a host protocol stack for processing. Subsequent requests for the same connection will be routed along the same path as the original request. In the present invention, different methods for organizing the offload/upload decision process are described with different advantages.

In the present invention, TCP and other protocols may also be offloaded/uploaded to/from a hardware based (TOE) during their active state as a method of freeing up processing resources. The capability to move connections between hardware processing stacks and software processing stacks, through offloading/uploading, allows many more connections to be supported with only the active connections being performed within the hardware processing stack.

The term offloading refers to moving state information processing from a host processing stack to a hardware processing stack. Uploading relates to moving state information processing from a hardware processing stack to a host processing stack. State information includes information related to a communication state of any particular node or user associated with an active communications session of the communications system (i.e. connection). The execution of download and upload also effects the routing of further requests and data associated with a particular connection so that they can be processed where the connection state is available.

Further features and advantages of the present invention as well as the structure and operation of various embodiments of the present invention, are described in detail below with reference to the accompanying drawings.

BRIEF DESCRIPTION OF THE FIGURES

The accompanying drawings, which are incorporated in and constitute part of the specification, illustrate embodiments of the present invention and, together with the general description given above and detailed description of the embodiments given below, serve to explain the principles of the invention. In the drawings.

DETAILED DESCRIPTION OF THE PREFERRED EMBODIMENTS

Figure 1:
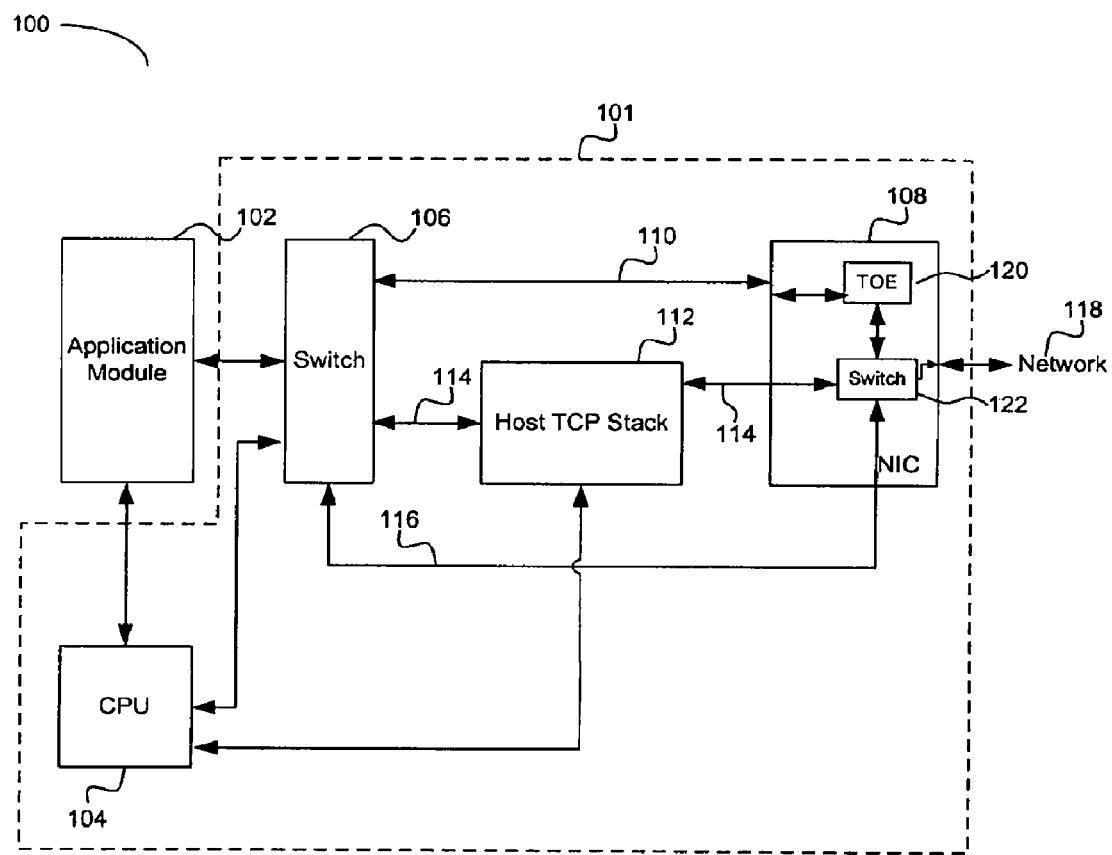
FIG. 1 is a block diagram illustration of a device structures and arranged in accordance with a first embodiment of the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 is a block diagram illustration of an exemplary computer system 100 structured and arranged in accordance with a first embodiment of the present invention. The computer system 100 can be, for example, a PC configured for network communications or a personal digital assistant (PDA). The computer system 100 can also include any other network capable computer device running an applications program.

In FIG. 1, the computer system 100 includes a transfer portion 101 and an applications module 102. The transfer portion 101, discussed in greater detail below, includes a number of hardware and/or software based modules. The transfer portion 101 is configured to efficiently transfer received data between the applications module 102 and an external network.

The applications module 102 can be implemented in any combination of software, firmware and/or hardware and is configured for hosting application software programs such as Oracle, FTP, a web browser, or the like, noted above. The application module 102 is coupled to a central processing unit (CPU) 104 and a switching device 106, each within the transfer portion 101. Although implemented in software in the embodiment of FIG. 1, the switching device 106 can also be implemented in firmware and/or hardware.

The computer system 100 enables TCP/IP and other protocols to be offloaded to hardware during their active state in order to increase the operational efficiency of the computer system 100. This decision can be made in one or more places using one or more elements to make the decision. Specifics of the switch 106 will be discussed in greater detail below. The CPU 104 is based upon standard Von Neuman computer architectural concepts. The CPU 104 executes applications implemented within the application module 102, the switch 106, and a protocol driver, such as a host TCP stack 112.

An output of the switch 106 is connected to a NID, such as a network interface controller (NIC) 108, along a bi-directional data path 110. Similarly, another output of the switch 106 is connected to the host TCP stack 112, which is in turn coupled to the NIC 108 along bi-directional data path 114. A feedback path 116 provides an additional connection between the host TCP stack 112, the switch 106, and the NIC 108. The NIC 108 enables the computer system 100 to forward communications data across a network 118.

The NIC 108 includes TOE 120 for processing offloaded connections and a switch 122 for sorting incoming packets between either the TOE 120 or the host TCP stack 112.

In the exemplary embodiment of FIG. 1, the applications module 102 can, for example, implement an FTP application and correspondingly generate data packets that use TCP/IP protocols. In this example, the application module 102 will submit communication requests to the host TCP stack 112, via the switch 106, to activate a communications session. An exemplary request might be to open a connection to the network 118 in order to forward communications data packets therethrough. During activation of the communications session, the applications module 102 will forward an open request to the switch 106 in order to establish a connection with the network 118 through the NIC 108.

In the exemplary embodiment of FIG. 1, the switch 106 is programmed to assess system conditions associated with transferring open requests. That is, the switch 106 determines whether the open request received from the module 102 should be forwarded to the NIC 108 via the data path 114 and through the host TCP stack 112. Alternatively, the switch 106 determines whether a more efficient communications session can be established by forwarding the open request directly to the NIC 108 across the data path 110. This alternative approach by-passes the host TCP stack 112 altogether and allows TCP/IP protocols, associated with connection processing, to be offloaded to the TOE stack 120 within the NIC 108. Although the embodiment of FIG. 1 conveys that the decision to offload the received request is made within the switch 106, the decision can be made in one or more locations using one or more additional switch elements, such as the switch 122.

The switch 106 makes the decision to offload based upon the requests transferred from the application module 102. Information relied upon by the switch 106 to make the offload decisions can include, to name a few, assigned TCP ports, IP addresses, level 2 addresses, and/or other higher level protocol elements.

The decision to offload can also incorporate an analysis of data associated with the amount of traffic particular connections of similar type have done. The decision to offload can also be controlled by limits in the number of connections supported by the TOE 120, along the path 110. Similarly, the decision to offload can rely upon data and configurations implemented within the host TCP stack 112, forwarded via the path 116.

Such data could include destination addresses of hosts where IP fragmentation has been experienced or could include other indications of a low performance connection to a specific host. Other data might indicate that connections of a certain type are of low bandwidth and would make poor use of the TOE resources. Still, other data might indicate that connections of a certain type have data passed from the application in very small pieces, which will not benefit from the TOE 120.

The switch 106 can derive specific information from the requests received from the application module 102. For example, the switch 106 can determine whether the application module 102 requires connection to a remote computer with a particular IP address.

Thus, based on the content of related protocols and various other factors, the switch 106 can determine whether to send the request along the path 114 to the host TCP stack 112 to the NIC 108, or to forward the data directly to the NIC 108 along the data path 110.

In this manner, the switch 106 can recognize that the request from the application module 102 is of a routine nature and can therefore be more efficiently handled by forwarding it directly to the NIC 108 for stack processing, without utilizing the host TCP stack 112. On the other hand, the switch 106 might be unable to immediately determine whether the requests can be forwarded directly to the NIC 108.

For example, the switch 106 may not know if the resulting connection will pass enough traffic to warrant being offloaded to the TOE 120. In this situation, and as a precautionary measure, the switch 106 will forward the request along the data path 114 to the host TCP stack 112 so that the host TCP stack 112 can preliminarily begin TCP/IP protocol processing. Which ever path is chosen, the switch 116 will continue to route further requests for the same connection in the same direction as the first request. Further, the switch 122, within the NIC 108, will be configured to match the decision of the switch 116 and may route received packets to the stack 112 as outgoing requests are routed.

Later (and optionally), the switch 106 and/or the host TCP tack 112 can recognize that the data and protocols, have changed. This change may occur because more traffic is traversing the connection and the connection now warrants the resources of the TOE 120. If this is observed, a handshake will be performed such that an offload operation of the open connection (e.g., active state) will happen. State information can be moved from the host TCP stack 112 to the TOE stack 120 within the NIC 108. After the offload, all future data packets associated with this particular connection will be forwarded to the TOE stack 120 along the data path 110. If the data and protocols have not changed, the host TCP stack 112 will continue processing the data and forward the processed data directly to the NIC 108 along the data path 114.

Thus, in the embodiment of FIG. 1, not only has the switch 106 been added to aid offload/upload decisions, but the host TCP stack 112 has been modified, beyond the capability of conventional TCP stacks, to also assist in this decision making process. The TCP 112 has also been modified or designed to allow offloading and uploading of connections during the active state. Conventional TCP stacks, however, are not structured to assist in this type of smart offloading/uploading and active state decision making, as achieved in the present invention. Conventional TCP stacks are also not structured to allow offload and upload of active connections.

Figure 2:
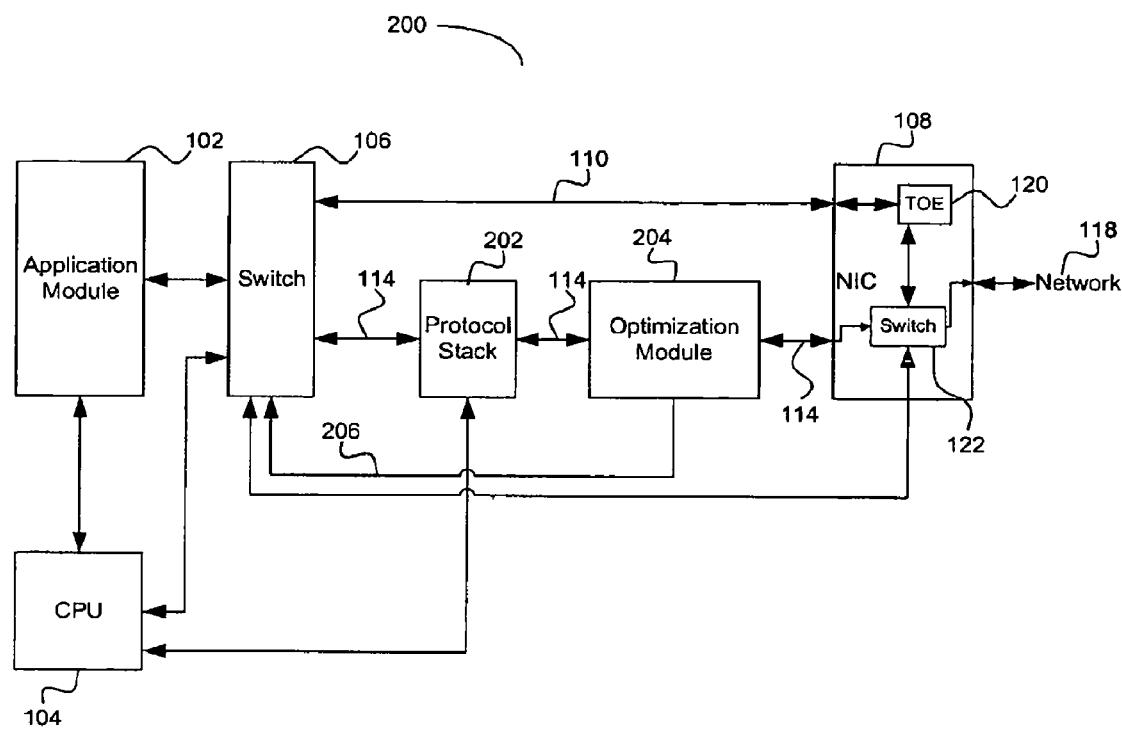
FIG. 2 is a block diagram illustration of a device structured and arranged in accordance with a second embodiment of the present invention.

FIG. 2 provides a block diagram illustration of a computer system 200 structured in accordance with a second embodiment of the present invention. FIG. 2 includes many of the components illustrated in and discussed with reference to, FIG. 1. Therefore, their descriptions from above also apply here and will not be repeated.

FIG. 2 includes a conventional (i.e. unmodified) protocol stack 202 (similar to the host TCP stack 112), along with a separate optimization module 204. The optimization module 204 is configured to assist in the smart offload decision making process. Thus, in the computer system 200 of FIG. 2, the switch 106 performs current offloading/uploading decisions, as discussed in FIG. 1. The optimization module 204, on the other hand, provides traffic pattern details to aid in future offload decisions made by the switch 106.

For example, the application module 102 can send a request to connect to the NIC 108 via the switch 106. In this example, the protocol stack 202 will perform conventional TCP/IP processing and subsequently forward the processed packet to the NIC 108 via the optimization module 204. In the computer system 200, the optimization module 204 determines whether future open requests of a similar nature will be forwarded to the NIC 108 via the protocol stack 202, or whether future open requests related to the same data stream can more efficiently be routed to the NIC 108, along the data path 110, for offloaded protocol stack processing.

If the optimization module 204 determines that data requests can more efficiently be forwarded to the NIC 108 along the data path 110, based on the factors noted above, the optimization module 204 will notify the switch 106 via a feedback path 206 that all future related open requests should be forwarded to the NIC 108 along the data path 110.

This process is dynamic. That is, some data connections within the data stream will be forwarded along the data path 110. Other data connections, however, will be forwarded to the NIC 108 via the data path 114 in accordance with states changes and communications network traffic. The advantage of the embodiment shown in FIG. 2 is that the protocol stack 202 is unmodified to support offload. This has engineering effort and testing effort benefits.

Figure 3:
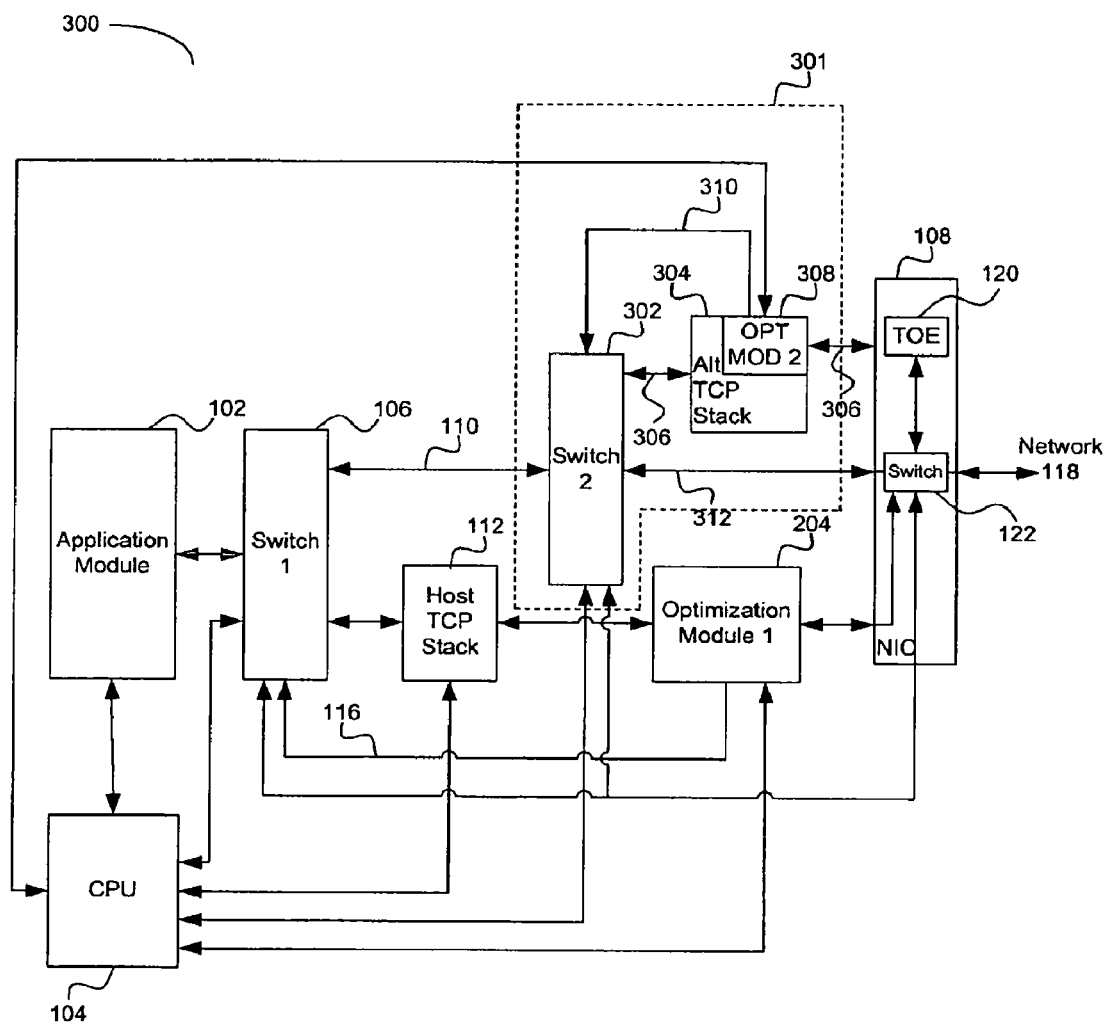
FIG. 3 is a block diagram illustration of a device structured and arranged in accordance with a third embodiment of the present invention.

FIG. 3 is a block diagram illustration of a computer system 300 structured in accordance with a third embodiment of the present invention. In FIG. 3, as in the case with FIG. 2, many of the components were described above and their descriptions need not be repeated. The computer system 300 provides functionality analogous to the computer system 200 of FIG. 2. The computer system 300, however, provides a migrating module 301 for accommodating offload. That is, connections, once offloaded from the primary Host TCP stack 112, can then be migrated back-and-forth between the offload NIC 108, a small alternate TCP stack 304, and an optimization module 308. The advantage of the system, as configured in FIG. 3, is that the main protocol stack 112 does not need to be modified.

In FIG. 3, the computer system 300 includes a second switch 302 coupled to the alternate TCP protocol stack 304 along a data path 306. The alternate TCP protocol stack 304 is also connected to the CPU 104. In FIG. 3, the second switch 302 optionally makes one of two possible determinations. The second switch 302 can determine whether requests forwarded from the application module 102 through the switch 106 are to be sent through a path 312 to the NIC 108. Alternatively, however, the second switch 302 can determine that these requests can be processed locally within the alternate TCP Stack 304. Also, a dedicated path 306 is provided to allow offloading/downloading of connection states to the TOE 120 within the NIC 108.

An alternate optimization module 308 can optionally be provided to support the decision making process of the alternate TCP stack 304. Similarly, an additional feedback path 310 can optionally be provided to support handshaking between the additional optimization module 308 and the second switch 302.

The advantage of the embodiment of FIG. 3 is that the basic host TCP stack 112 and the first module 204 can off load all connections, or any subset of those connections, that it believes will be good candidates for offloading through the path 110. These connections are offloaded using the switch 106 without regard for any connection count limits of the TOE 120, and without the Host TCP stack supporting dynamic offloading/uploading. The second switch 302 can then make more fine-tuned adjustments by forwarding traffic either directly to the TOE 120, or through the alternate TCP stack 304.

The alternate stack 304 can be somewhat faster than the host TCP stack 112 since it deals with fewer special cases. Further, the alternate stack 304 can keep more detailed statistics that can aid in determining what connections will best be handled by the TOE 120. The alternate TCP stack 304 can also support the path for moving connection state to/from the TOE 120 so that connections can be dynamically moved between the TOE 120 and the alternate TCP stack 304 as individual connection loads change.

Since the TOE 120 and the alternate TCP stack 304 are functionally similar, it is possible to accelerate the moving of state between these two stack implementations allowing faster, more efficient upload/download operations during the life of a connection.

Figure 4:
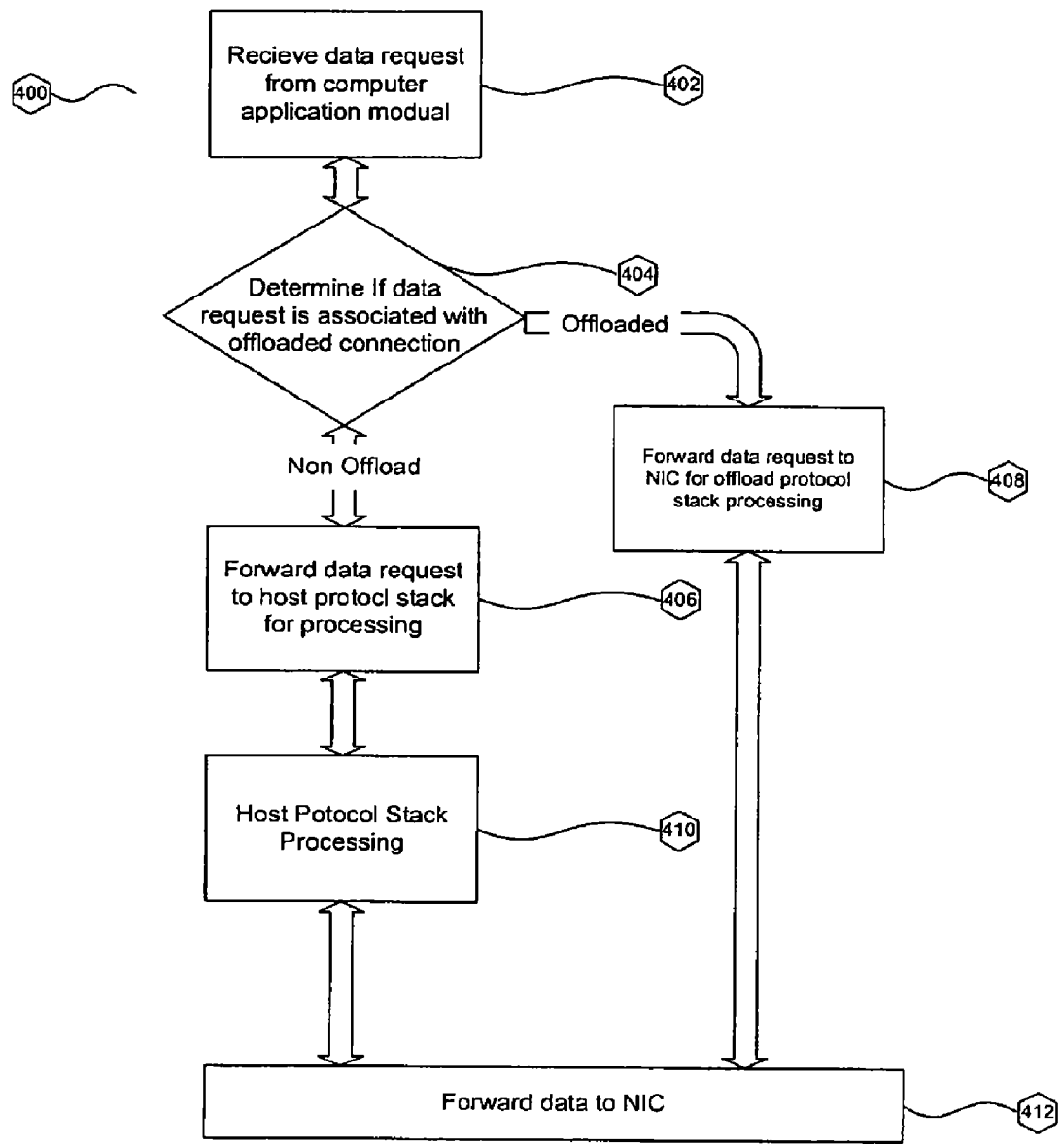
FIG. 4 is a flowchart of an exemplary method of practicing an embodiment of the present invention.

FIG. 4 is a flowchart of an exemplary method 400 of practicing an embodiment of the present invention. In the method 400, data requests are received from a computer applications module in a data processing system, as indicated in block 402. In step 404, a determination is made whether the received data request is associated with an offload or non-offload connection. If the request is part of a non-offloaded connection, the request is forwarded to the host protocol stack 112 for processing in step 406. On the other hand, if the connection is offloaded, then processing continues with step 408 where the data request is forwarded to the NIC 108 for offload protocol processing.

In step 410, the host protocol stack 112 processes the received data request. The processed request is then forwarded to the NIC 108, as indicated in step 412.

As noted above, the present invention allows more connections to be smartly offloaded to more efficiently utilize related processing CPU capability. Because NIC TOE hardware is inexpensive, but usually has limitations, smart offloading ensures that the TOE hardware is utilized to it's maximum capability, leaving the host TCP stacks, within the present invention, handle only the less busy connections. This leaves expensive CPUs free to run their associated application modules faster. Ultimately, the effort required to download and upload a connection between an alternate TCP stack and the TOE 120 can be optimized to a greater extent than the processes between traditional host TCP stacks and TOE devices. In this manner, a communications computer system can provide more efficient and reliable communications between application modules and remote-end communications devices.

Figure 5:
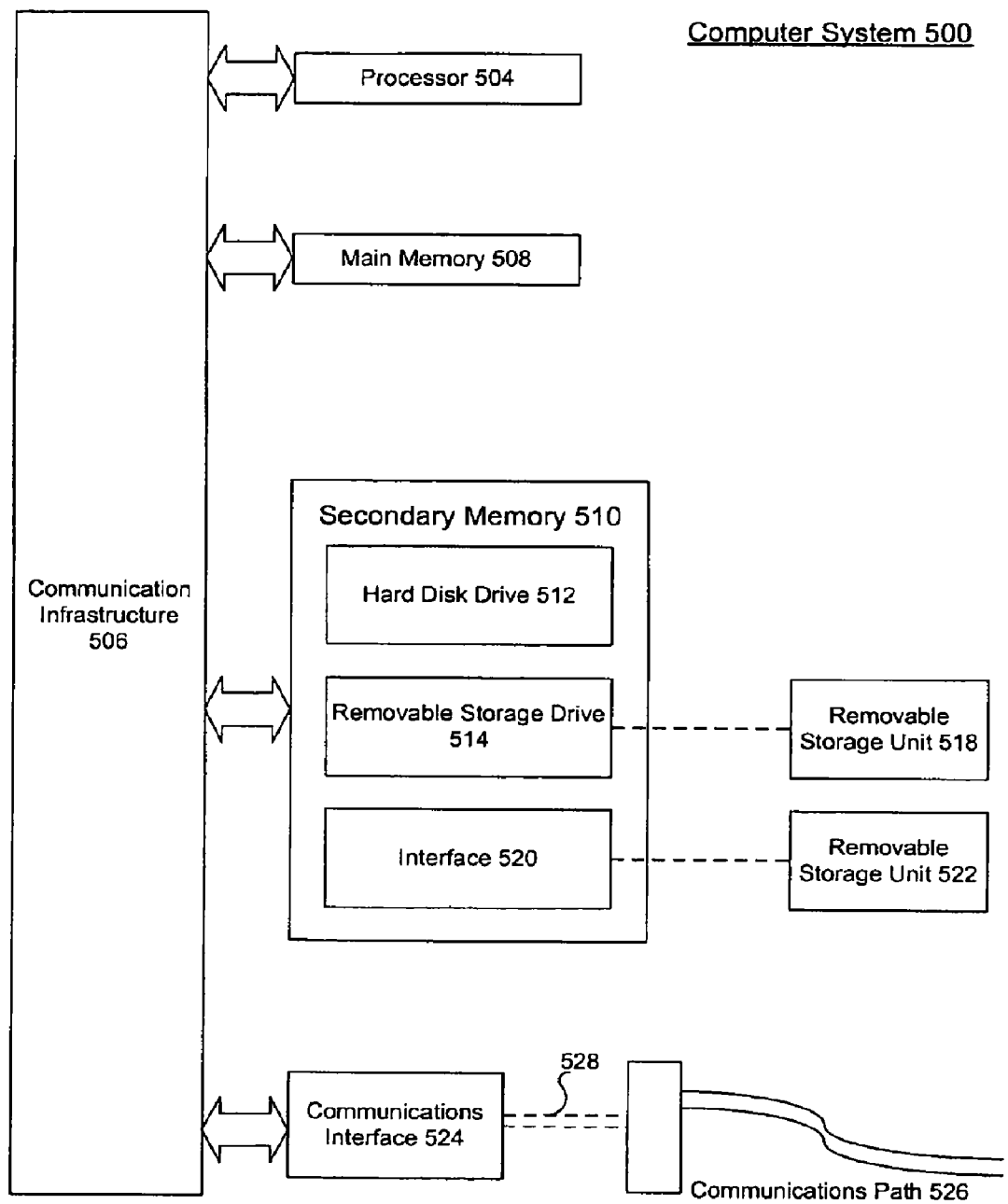
FIG. 5 is block diagram illustration of an exemplary computer system on which the present invention can be practiced.

As stated above, the present invention can be implemented in hardware, or as a combination of software and hardware. Consequently, the invention may be implemented in the environment of a computer system or other processing system. An example of such a computer system 500 is shown in FIG. 5.

The computer system 500 includes one or more processors, such as a processor 504. The processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the invention using other computer systems and/or computer architectures.

The computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. The removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative implementations, the secondary memory 510 may include other similar means for allowing computer programs or other instructions to be loaded into the computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and the other removable storage units 522 and the interfaces 520 which allow software and data to be transferred from the removable storage unit 522 to the computer system 500.

The computer system 500 may also include a communications interface 524. The communications interface 524 allows software and data to be transferred between the computer system 500 and external devices. Examples of the communications interface 524 may include a modem, a network interface (such as an Ethernet card), a communications port, a PCMCIA slot and card, etc. Software and data transferred via the communications interface 524 are in the form of signals 528 which may be electronic, electromagnetic, optical or other signals capable of being received by the communications interface 524. These signals 528 are provided to the communications interface 524 via a communications path 526. The communications path 526 carries the signals 528 and may be implemented using wire or cable, fiber optics, a phone line, a cellular phone link, an RF link and other communications channels.

In the present application, the terms "computer readable medium" and "computer usable medium" are used to generally refer to media such as the removable storage drive 514, a hard disk installed in the hard disk drive 512, and the signals 528. These computer program products are means for providing software to the computer system 500.

Computer programs (also called computer control logic) are stored in the main memory 508 and/or the secondary memory 510. Computer programs may also be received via the communications interface 524. Such computer programs, when executed, enable the computer system 500 to implement the present invention as discussed herein.

In particular, the computer programs, when executed, enable the processor 504 to implement the processes of the present invention. Accordingly, such computer programs represent controllers of the computer system 500. By way of example, in the embodiments of the invention, the processes/methods performed by signal processing blocks of encoders and/or decoders can be performed by computer control logic. Where the invention is implemented using software, the software may be stored in a computer program product and loaded into the computer system 500 using the removable storage drive 514, the hard drive 512 or the communications interface 524.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An apparatus for transferring data between a computer applications module and a network interfacing device (NID), the apparatus comprising:
    a switching module configured to (i) receive the data from the applications module, (ii) assess conditions associated with transferring the received data, and (iii) determine whether a more efficient transfer can be established based on the assessed conditions;
    wherein the switching module is further configured to transfer the received data to a host protocol stack when the received data is assessed to be a first type, and
    wherein the switching module is further configured to transfer the received data to the NID when the switching module assesses the received data to he a second type, thereby bypassing the host protocol stack, and
    wherein the data assessed as the first type and the data assessed as the second type go through same type of processing.

2. The apparatus of claim 1, wherein the data is representative of a transmission control protocol connection.

3. The apparatus of claim 1, wherein the data is representative of packetized information.

4. The apparatus of claim 1, wherein the host protocol stack includes a stacking portion and an optimization portion.

5. The apparatus of claim 4, wherein the host protocol stack receives the first type transferred data along a first path;
    wherein the NID receives second type data along a second path; and
    wherein the optimization portion is configured to determine whether future first and second type data is transferred along the first data path or the second data path.

6. An apparatus for transferring data between an applications portion and a network, comprising:
    a first switch, configured to receive data from the applications portion, assess conditions associated with transferring the received data to the network, and determine whether a more efficient transfer can be established based on the assessed conditions:
    a first stack configured to (i) receive the transferred data from the switch when the assessed conditions are representative of a first environment and (ii) process the transferred data to produce a first output;
    a migrating portion, including a second stack, configured to (i) receive the transferred data from the switch when the assessed conditions are representative of a second environment and (ii) process the transferred data to produce a second output; and
    a network interface device (NID) including a third stack communicably coupled to the first stack and the migrating portion;
    wherein the migrating portion is configured to dynamically move the transferred data between the second stack and the third stack in accordance with predetermined requirements, and
    wherein the data assessed as the first type and the data assessed as the second type go through same type of processing.

7. The apparatus of claim 6, wherein the conditions include at least one of connection count limits, state variables, status of open requests, assigned TCP ports, P addresses, and protocol elements.

8. The apparatus of claim 6, wherein the first stack is software based.

9. The apparatus of claim 8, wherein the third stack is hardware based.

10. The apparatus of claim 9, wherein the first stack is a host TCP stack;
    wherein the second stack is an alternate TCP stack; and
    wherein the third stack is a TCP offload engine.

11. The apparatus of claim 10, wherein the migrating portion includes a second switch.

12. The apparatus of claim 11, wherein the second stack includes an optimization module.

13. A method for transferring data between a computer applications module and a network interface device within a data communications system, the method comprising:
    receiving data requests from the computer applications module;
    determining if a more efficient transfer can be established by assessing system conditions including the data requests, and determining if the data requests are associated with an offload connection;
    forwarding the received data requests for a first type processing if an offload is not required;
    forwarding the received data requests for a second type processing if an offload is required;
    wherein the receiving, determining, and forwarding are performed via a switching module; and
    performing at least one of the first and second type processing, wherein the data assessed as the first type and the data assessed as the second type go through same type of processing.

14. The method of claim 13, wherein the first type processing includes processing host protocol stack processing.

15. The method of claim 14, wherein the second type processing includes network interface device protocol stack processing.

* * * * *

UNITED STATES PATENT AND TRADEMARK OFFICE
CERTIFICATE OF CORRECTION

| | | |
|---|---|---|
| PATENT NO. | : 8,358,664 B2 | |
| APPLICATION NO. | : 12/615632 | |
| DATED | : January 22, 2013 | |
| INVENTOR(S) | : Fan et al. | |

It is certified that error appears in the above-identified patent and that said Letters Patent is hereby corrected as shown below:

In the Claims:

Column 9, Line 48, replace "he a second type" with -- be a second type --
Column 10, Line 5, replace "conditions:" with -- conditions; --

Signed and Sealed this
Fourteenth Day of May, 2013

Teresa Stanek Rea
*Acting Director of the United States Patent and Trademark Office*